(12) United States Patent
Fang (10) Patent No.: US 12,200,295 B2
(45) Date of Patent: *Jan. 14, 2025

(54) SET-TOP BOX WITH ENHANCED BEHAVIORAL CONTROLS AND SYSTEM AND METHOD FOR USE OF SAME

(71) Applicant: Enseo, LLC, Plano, TX (US)

(72) Inventor: William C. Fang, Plano, TX (US)

(73) Assignee: Enseo, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/330,207

(22) Filed: Jun. 6, 2023

(65) Prior Publication Data

US 2023/0319343 A1     Oct. 5, 2023

Related U.S. Application Data (63) Continuation of application No. 17/672,130, filed on Feb. 15, 2022, now Pat. No. 11,671,650, which is a continuation of application No. 17/079,021, filed on Oct. 23, 2020, now Pat. No. 11,252,468, which is a continuation-in-part of application No. 16/916,771, filed on Jun. 30, 2020, now Pat. No. 11,128,912, which is a continuation of application No. 16/545,103, filed on Aug. 20, 2019, now Pat. No. 10,701,436, which is a continuation of application No. 15/969,001, filed on May 2, 2018, now Pat. No. 10,390,079.

(Continued)

(51) Int. Cl.
| | | |
|---|---|---|
| H04N 21/436 | (2011.01) | |
| G07C 9/00 | (2020.01) | |
| H04N 21/214 | (2011.01) | |
| H04N 21/41 | (2011.01) | |
| H04N 21/422 | (2011.01) | |
| H04N 21/6587 | (2011.01) | |

(52) U.S. Cl.
CPC ............... *H04N 21/43615* (2013.01); *G07C 9/00174* (2013.01); *G07C 9/00309* (2013.01); *G07C 9/00904* (2013.01); *H04N 21/2143* (2013.01); *H04N 21/4126* (2013.01); *H04N 21/42204* (2013.01); *H04N 21/6587* (2013.01); *G07C 2009/00507* (2013.01); *G07C 2009/00825* (2013.01); *G07C 2209/62* (2013.01)

(58) Field of Classification Search
None
See application file for complete search history.

(56) References Cited

U.S. PATENT DOCUMENTS

| | | |
|---|---|---|
| 4,717,816 A | 1/1988 | Raymond et al. |
| 4,947,163 A | 8/1990 | Henderson et al. |

(Continued)

*Primary Examiner* — Omar S Parra
(74) *Attorney, Agent, or Firm* — Scott Griggs; Griggs Bergen LLP (57) ABSTRACT

A set-top box with enhanced behavioral controls and system and method for use of the same are disclosed. In one embodiment of the set-top box, a wireless transceiver is located within a housing, which also interconnectively includes a signal input, a signal output, a processor, and memory. The set-top box may pair with an electronic door locking apparatus coupled to a door that is room-collocated with the set-top box in a hospitality establishment. The set-top box may then reprogram the electronic door locking apparatus as well as control amenities, such as a display, in response to presence signal from the electronic door locking apparatus.

18 Claims, 5 Drawing Sheets

Related U.S. Application Data

(60) Provisional application No. 62/925,807, filed on Oct. 25, 2019, provisional application No. 62/500,015, filed on May 2, 2017.

(56) References Cited

U.S. PATENT DOCUMENTS

| | | |
|---|---|---|
| 5,745,044 A | 4/1998 | Hyatt, Jr. et al. |
| 5,774,059 A | 6/1998 | Henry et al. |
| 5,815,557 A | 9/1998 | Larson |
| 5,838,251 A | 11/1998 | Brinkmeyer et al. |
| 5,936,544 A | 8/1999 | Gonzales et al. |
| 5,979,754 A | 11/1999 | Martin et al. |
| 6,049,289 A | 4/2000 | Waggamon et al. |
| 6,166,650 A | 12/2000 | Bruwer |
| 6,300,873 B1 | 10/2001 | Kucharczyk et al. |
| 6,438,450 B1 | 8/2002 | DiLorenzo |
| 6,570,488 B2 | 5/2003 | Kucharczyk et al. |
| 6,975,202 B1 | 12/2005 | Rodriguez et al. |
| 10,390,079 B2 | 8/2019 | Miller et al. |
| 10,701,436 B2 | 6/2020 | Miller et al. |
| 11,671,650 B2 | 6/2023 | Fang |
| 2011/0314492 A1 | 12/2011 | Cassidy |
| 2013/0024222 A1 | 1/2013 | Dunn |
| 2017/0127222 A1 | 5/2017 | Lang |
| 2022/0174350 A1 | 6/2022 | Fang |

SET-TOP BOX WITH ENHANCED BEHAVIORAL CONTROLS AND SYSTEM AND METHOD FOR USE OF SAME

PRIORITY STATEMENT & CROSS-REFERENCE TO RELATED APPLICATIONS

This application is a continuation of U.S. patent application Ser. No. 17/672,130, entitled "Set-Top Box with Enhanced Behavioral Controls and System and Method for Use of Same", filed on Feb. 15, 2022 in the name of William C. Fang, now U.S. Pat. No. 11,671,650, issued on Jun. 6, 2023; which is a continuation of U.S. patent application Ser. No. 17/079,021, entitled "Set-Top Box with Enhanced Behavioral Controls and System and Method for Use of Same", filed on Oct. 23, 2020 in the name of William C. Fang, now U.S. Pat. No. 11,252,468, issued on Feb. 15, 2022; which claims priority from U.S. Patent Application No. 62/925,807, entitled "Set-Top Box with Enhanced Behavioral Controls and System and Method for Use of Same", filed on Oct. 25, 2019, in the name of William C. Fang; both of which are hereby incorporated by reference, in entirety, for all purposes. U.S. patent application Ser. No. 17/079,021 is also a continuation-in-part to U.S. patent application Ser. No. 16/916,771, entitled "Set-Top Box with Enhanced Behavioral Controls and System and Method for Use of Same", filed on Jun. 30, 2020 in the names of Thomas R. Miller, et al., now U.S. Pat. No. 11,128,912, issued on Sep. 21, 2021; which is a continuation of U.S. patent application Ser. No. 16/545,103, entitled "Set-Top Box with Enhanced Behavioral Controls and System and Method for Use of Same", filed on Aug. 20, 2019 in the names of Thomas R. Miller et al., now U.S. Pat. No. 10,701,436, issue don Jun. 30, 2020 which is a continuation of U.S. patent application Ser. No. 15/969,001, entitled "Set-Top Box with Enhanced Behavioral Controls and System and Method for Use of Same", filed on May 2, 2018 in the names of Thomas R. Miller, et al., now U.S. Pat. No. 10,390,079, issued on Aug. 20, 2019; which claims the benefit of U.S. Provisional Patent Application No. 62/500,015, entitled "Set-Top Box with Enhanced Behavioral Controls and System and Method for Use of Same", filed on May 2, 2017, in the names of Thomas R. Miller, et al., all of which are hereby incorporated by reference, in entirety, for all purposes.

TECHNICAL FIELD OF THE INVENTION

This invention relates, in general, to set-top boxes and, in particular, to set-top boxes with enhanced behavior controls and systems and methods for use of the same that address the work and function of locking systems within a room in a hospitality establishment, for example.

BACKGROUND OF THE INVENTION

Without limiting the scope of the present invention, the background will be described in relation to locking systems in the hospitality lodging industry, as an example. Known locking systems include a mechanical lock requiring a physical key inserted into the lock in order to open the lock for access. More advanced known locking systems include magnetic access cards and radio frequency identification (RFID) access cards; both of which use various encoding schemes and contact or proximity in order to open the lock for access. Consumers and particularly hotel guests are demanding enhanced capabilities in ever increasingly easy-to-use platforms. As a result of such consumer and hotel guest preferences, locking systems serving hotel guests must address issues of convenience in addition to traditional problems of misplacement and security. Accordingly, there is a need for improved systems and methods for use of the same that address the work and function of locking systems within a room in a hospitality establishment, for example.

SUMMARY OF THE INVENTION

It would be advantageous to achieve a set-top box that would improve upon existing limitations in functionality with respect to locking systems. It would also be desirable to enable a computer-based electronics and software solution that would provide enhanced behavioral controls in an easy-to-use platform in the hospitality lodging industry or in another environment. To better address one or more of these concerns, a set-top box with enhanced behavioral controls and system and method for use of the same are disclosed. In one embodiment of the set-top box, a wireless transceiver is associated with a housing, which also interconnectively includes a signal input, a signal output, a processor, and memory.

The set-top box may pair with an electronic door locking apparatus coupled to a door that is room-collocated with the set-top box in a hospitality establishment. The set-top box may reprogram the electronic door locking apparatus as well as control amenities, such as a display or television, in response to a presence signal from the electronic door locking apparatus. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not delimit the scope of the present invention.

Figure 1:
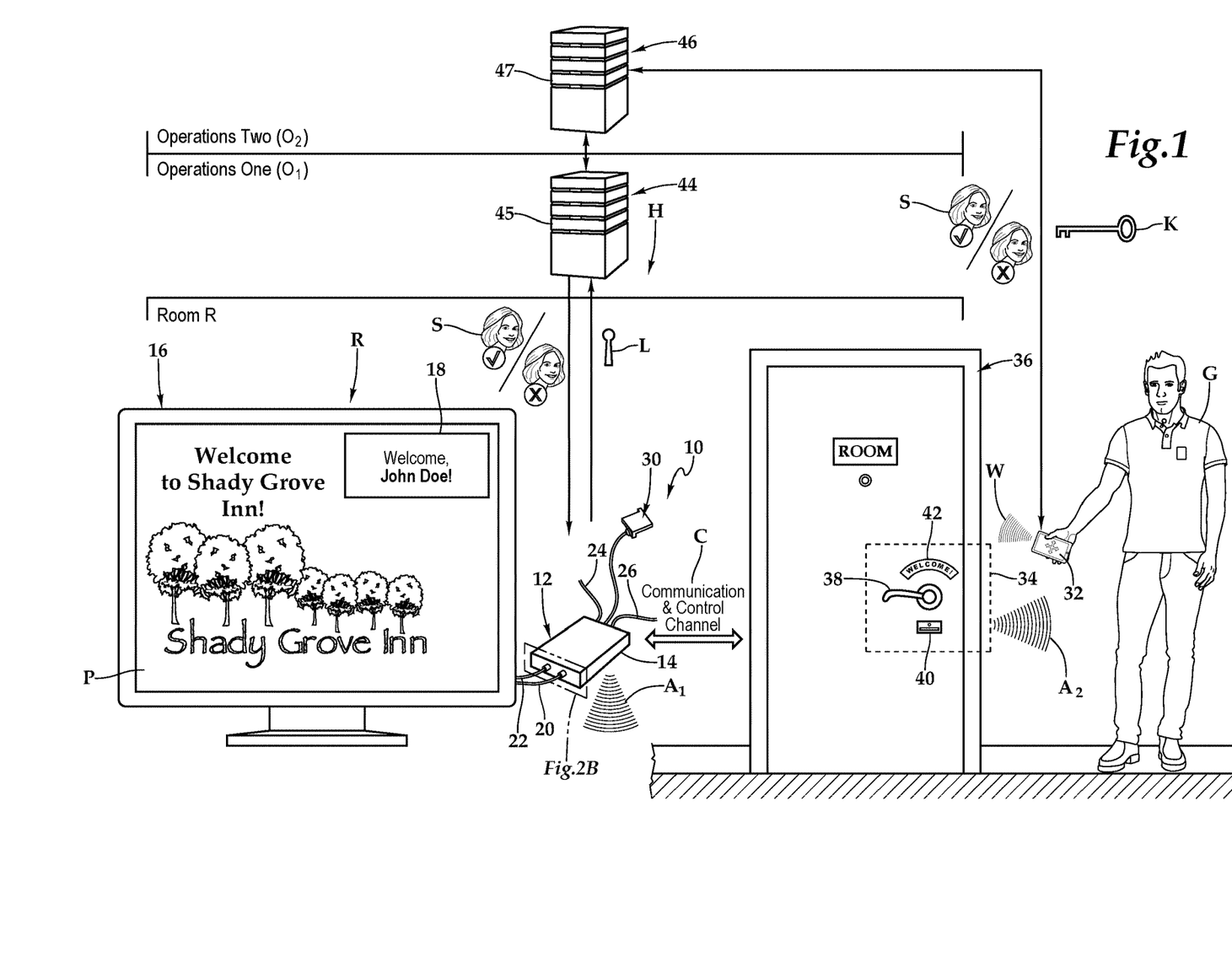
FIG. 1 is a schematic diagram depicting one embodiment of a system for providing a set-top box having enhanced behavioral controls therein according to the teachings presented herein.

Referring initially to FIG. 1, therein is depicted one embodiment of a system 10 utilizing a set-top box 12 with enhanced behavioral controls being employed within a hospitality lodging establishment. The hospitality lodging establishment or, more generally, hospitality property, may be a furnished multi-family residence, dormitory, lodging establishment, hotel, hospital, or other multi-unit environment. As shown, by way of example and not by way of limitation, the hospitality environment is depicted as a hotel H having various rooms, including a room R, and spaces, which may be common spaces. The set-top box 12 includes a housing 14 and is communicatively disposed with various amenities associated with the hospitality environment, including a display 16. Set-top boxes, like the set-top box 12, may be deployed throughout the rooms and spaces of the hotel H. It should be appreciated that although a hospitality environment is depicted, the system 10 and teachings herein are not limited to hospitality environments. By way of example and not by way of limitation, the system 10 and teachings herein are applicable to any multi-unit environment, including business, residential, and institutional properties.

As shown, in one embodiment, within the room R or space, such as a lobby, elevator foyer, or other common space, for example, the system 10 includes the set-top box 12 and the display 16, which is illustrated as a television having a screen with a message 18. It should be appreciated however, that the display 16 may also be any electronic visual display device, for example. A connection, which is depicted as an HDMI connection 20, connects the set-top box 12 to the display 16. Other connections include a power cable 22 coupling the set-top box 12 to a power source, a coaxial cable 24 coupling the set-top box 12 to an external cable source, and a category five (Cat 5) cable 26 coupling the set-top box 12 to an external pay-per-view source at a hotel or other lodging establishment, for example. As shown, the set-top box 12 may include a dongle 30 providing particular technology and functionality extensions thereto. That is, the set-top box 12 may be a set-top box-dongle combination in one embodiment. More generally, it should be appreciated that the cabling connected to the set-top box 12 will depend on the environment and application, and the cabling connections presented in FIG. 1 are depicted for illustrative purposes. Further, it should be appreciated that the positioning of the set-top box 12 will vary depending on environment and application and, with certain functionality, the set-top box 12 may be placed more discretely behind the display 16.

A proximate wireless-enabled interactive programmable device 32 may be a device, including handheld devices, that may be supplied or carried by the guest G and may be selected from a range of existing devices, such as, smart devices, personal computers, laptops, tablet computers, smart phones, and smart watches, for example. In one implementation, advertising broadcast data originating from the set-top box 12 or the proximate wireless-enabled interactive programmable device 32 or an electronic door apparatus 34 may be utilized to identify the proximate wireless-enabled interactive programmable device 32. Moreover, as will also be discussed in further detail hereinbelow, in another implementation, an application installed from a server enables the set-top box 12 and the proximate wireless-enabled interactive programmable device 32 to be wirelessly paired. In another embodiment, a challenge response is utilized to wirelessly pair the set-top box 12 and the proximate wireless-enabled interactive programmable device 32, when the guest G and the proximate wireless-enabled interactive programmable device 32 are located within the room R.

As shown, an interactive portal P is displayed on the display 16, which displays a general welcome for the hospitality lodging establishment. In one implementation, as illustrated, the set-top box 12 extends a physical authorization interface, shown as area $A_1$, from the set-top box 12 to an area easily accessible to a guest's convenience within the room R. This physical authorization interface $A_1$ may include a short-range wireless data connection that is enabled only when very close physically to the proximate wireless-enabled interactive programmable device 32, for example.

The set-top box 12 may pair with the electronic door locking apparatus 34 coupled to a door 36 that is room-collocated with the set-top box 12 in the room R of the hospitality establishment. As shown, the door 36 includes a handle 38 with an electronic reader 40 and an indicator 42 that indicates "Welcome." The set-top box 12 may then receive a status signal from the electronic door locking apparatus 34 relative to the open/closed status of the door 36 or locked/unlocked status of the door 36, for example. In another aspect, the set-top box 12 may forward the status signal to the display 16 associated with the set-top box 12 or forward the status signal to a server, such as a property server 44, which has a housing 45, in an Operations One ($O_1$) layer or a system server 46, which has a housing 47, in an Operations Two ($O_2$) layer, as will be discussed in FIG. 2A and FIG. 2B. As shown, the set-top box 12 may be exchanging signals with the electronic door locking apparatus 34 and the door 36 is presently locked with the indicator 42 indicating "Welcome." This status may also be shown on the display 16 at the message 18, which may be selectively and controllably actuatable.

The set-top box 12 may utilize a search operation, for example, to identify the proximate wireless-enabled interactive programmable device 32 and responsive to identifying the proximate wireless-enabled interactive programmable device 32, receive guest control instructions regarding control functionality input and send a command to the electronic door apparatus 34. The guest control instructions may be a wireless transmission W. In another embodiment, the set-top box 12 may receive control functionality input instructions from a remote server, such as the property server 44 or system server 46 of FIG. 2A and FIG. 2B, and process these instructions and send a command to the electronic door apparatus 34. Further, the set-top box 12 in combination with the remote server, such as the property server 44 of FIG. 2A and FIG. 2B, may evaluate access keycard data and determine access rights at the electronic door apparatus 34 responsive thereto.

In one implementation, as illustrated, the electronic door apparatus 34 extends a physical authorization interface, shown as area $A_2$, from the electronic door apparatus 34 to an area easily accessible to a guest's convenience near the door 36. This physical authorization interface $A_2$ may include a short-range wireless data connection that is enabled only when very close physically to the proximate wireless-enabled interactive programmable device 32, for example. The electronic door apparatus 34 may utilize a search operation, for example, to identify the proximate wireless-enabled interactive programmable device 32 and responsive to identifying the proximate wireless-enabled interactive programmable device 32, receive guest control instructions regarding control functionality input and send a command to the door 36 via the electronic door apparatus 34. The guest control instructions may be a wireless transmission W.

In some embodiments, the system 10 and the set-top box 12 provide integration of the electronic door apparatus 34 at the door 36 and the set-top box 12. The set-top box 12 may then be utilized as a guest room controller between a hotel reservation and management system distributed between the property server 44 and the system server 46 and the guest G regarding the management and status of the door 36 including the door lock. In one operational embodiment, the guest G may make a room reservation to stay at the hospitality property H and select the room R. The guest G may interface with the system server 46 to complete the reservation process. The property server 44 may wait on the status of the room R from housekeeping. Once the guest has checked in, either in person or utilizing the proximate wireless-enabled interactive programmable device 32, the check-in/check-out status S on the proximate wireless-enabled interactive programmable device 32 and with the system server 46 is "Check-In." Additionally, the system server 46 may provide the check-in/check-out status S to the property server 44, which, in turn, provides the check-in/check-out status S as "Check-In" to the set-top box 12 associated with the room R.

The system server 46 may then provide a new electronic key K to the proximate wireless-enabled interactive programmable device 32 associated with the guest G. In a complimentary fashion, a new keyless entry code L is issued by the property server 44 to the set-top box 12. Utilizing a communication and control channel C, the set-top box 12, in one embodiment, wirelessly provides the new keyless entry code L to the electronic door apparatus 34. As illustrated in FIG. 1, the guest G may then arrive at the door 36 to the room R. The electronic door apparatus 34 detects the presence of the guest G by establishing a pairing with the proximate wireless-enabled interactive programmable device 32. Once the pairing is established between the electronic door apparatus 34 and the proximate wireless-enabled interactive programmable device 32, the electronic door apparatus 34 unlocks the door in response to the matching of the electronic key K and the keyless entry code L.

The electronic door apparatus 34 also sends a guest presence signal from the electronic door apparatus 34 to the set-top box 12 via the communication and control channel C. The set-top box 12 then sends a command signal to the display 16 to turn the display 16 on. The set-top box 12 may also send a command signal to the display 16 to initiate a gateway. As illustrated, the gateway includes the message 18 that welcomes the guest G to the room R and hospitality establishment H. During the stay of the guest G, for any reason, the property server 44 by way of communication with the electronic door apparatus 34 via the set-top box 12 may revoke a keyless entry code L and issue a new keyless entry code L.

As alluded, during the stay of the guest G in the room R, the electronic door apparatus 34 may utilize the communication and control channel C with the set-top box 12 to provide status updates and communications between the display 16 and the electronic door apparatus 34. By way of example and not by way of limitation, such information exchanged and provided may include informing the guest G that the door 36 is open or enabling, with visual verification, the "Do Not Disturb" message on the door 36. Additionally, the guest G may view the folio provided by the property server 44 or the system server 46 to the set-top box 12 via the display 16. Alternatively, the guest G may view the folio provided by the property server 44 or the system server 46 to the proximate wireless-enabled interactive programmable device 32. On viewing the folio, the guest G may check out. If the guest checks out via the display 16 and the set-top box 12, then the set-top box 12 updates the check-in/check-out status S with the property server 44 and the system server 46. Alternatively, if the guest G checks out via the proximate wireless-enabled interactive programmable device 32, then the proximate wireless-enabled interactive programmable device 32 updates the check-in/check-out status S with the system server 46, which may share the information with the property server 44 and the set-top box 12. After the guest G has checked out, the electronic door apparatus 34 may send the set-top box 12 a guest leave signal, when the guest G leaves the room R through the door 36. The set-top box 12 may then relay the guest leave signal to the property server 44. The property server 44, in turn, may then revoke the keyless entry code L associated with the guest G by sending the appropriate signals to the electronic door apparatus 34 and the proximate wireless-enabled interactive programmable device 32.

It should be appreciated that the property server 44 and system server 46 may be located on a single property to serve one or more displays thereon. Further, it should be appreciated that the property server 44 and the system server 46 may be remotely located to serve multiple properties having multiple displays.

Figure 2A:
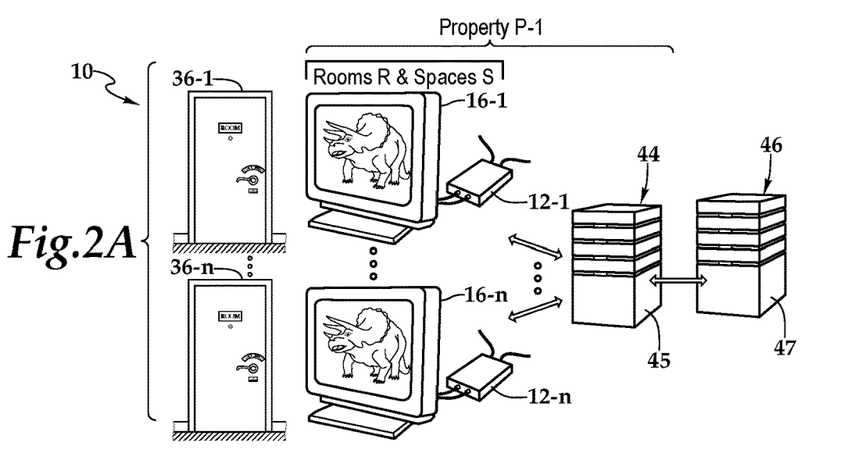
FIG. 2A is a schematic diagram depicting one embodiment of the system of FIG. 1 within an on-property deployment.

Referring now to FIG. 2A, the system 10 may be deployed such that the property server 44 is collocated on the property P-1 with the displays 16-1 . . . 16-n and the corresponding set-top boxes 12-1 . . . 12-n, and doors 36-1 . . . 36-n, with, in one embodiment, the property server 44 configured to handle hotel reservations and management across properties. As previously alluded, the property server 44 may store the access keycard data for access by the set-top box 12 or, alternatively, for downloading prior to use by the set-top box 12.

Figure 2B:
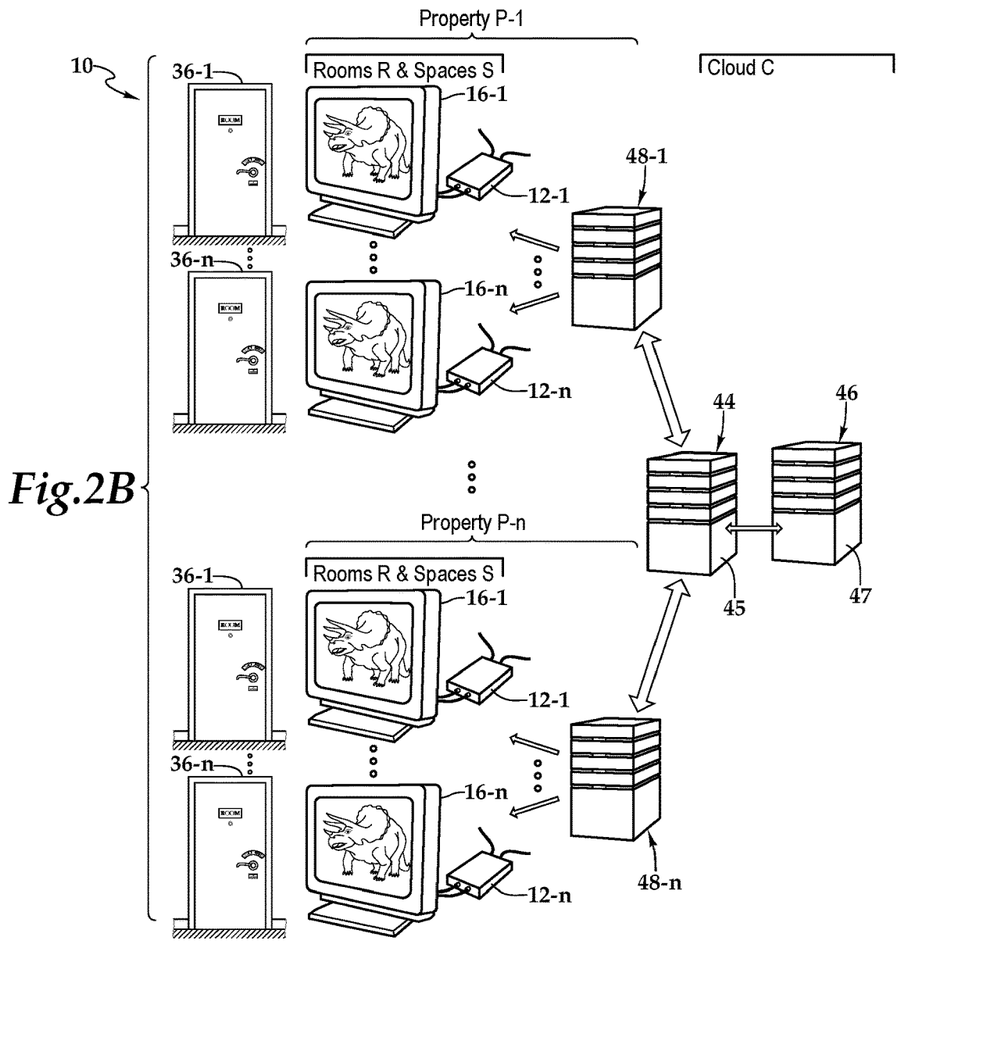
FIG. 2B is a schematic diagram depicting one embodiment of the system of FIG. 1 within a cloud-computing deployment.

Referring to FIG. 2B, the system 10 may be deployed such that the property server 44 is located remotely within cloud C relative to displays 16-1 . . . 16-n, which are located at properties P-1 through P-n. In particular, the property server 44, which is located in communication with the system server 46, may be located remotely relative to the displays 16-1 . . . 16-n and any set-top boxes 12-1 . . . 12-n with the doors 36-1 . . . 36-n such that a property headend 48-1 . . . 48-n is interposed between the property server 44 and the displays 16-1 . . . 16-n. As shown, in this implementation, the property headend 48-1 . . . 48-n is co-located with the displays 16-1 . . . 16-n at a respective property, P-1 through P-n. It should be appreciated that various deployments of the property server 44 and the system server 46 may be employed.

Referring to FIG. 3A, FIG. 3B, FIG. 3C, and FIG. 4, as used herein, set-top boxes, back boxes and set-top/back boxes may be discussed as set-top boxes. By way of example, the set-top box 12 may be a set-top unit that is an information appliance device that generally contains set-top box functionality including having a television-tuner input and displays output through a connection to a display or television set and an external source of signal, turning by way of tuning the source signal into content in a form that can then be displayed on the television screen or other display device. Such set-top boxes are used in cable television, satellite television, and over-the-air television systems, for example.

Figure 3A:
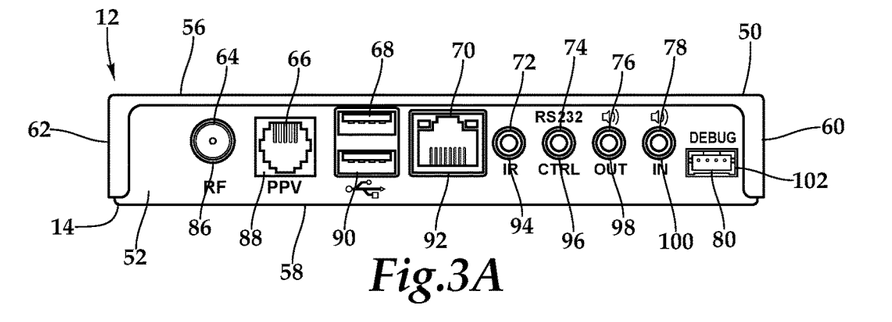
FIG. 3A is a wall-facing exterior elevation view of one embodiment of the set-top box depicted in FIG. 1 in further detail.
Figure 3B:
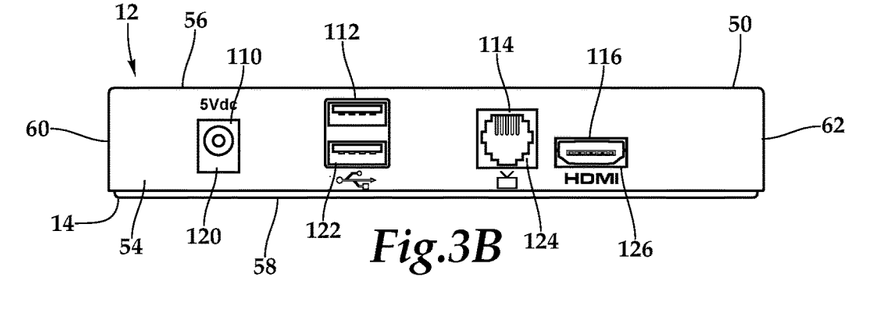
FIG. 3B is a display-facing exterior elevation view of the set-top box depicted in FIG. 1.
Figure 3C:
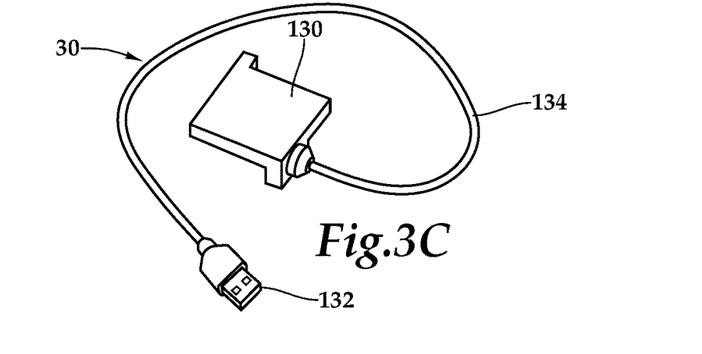
FIG. 3C is a front perspective view of a dongle depicted in FIG. 1 in further detail.

The set-top box 12 includes the housing 14 with a cover 50 and a rear wall 52, front wall 54, top wall 56, bottom base 58, and two sidewalls 60, 62. It should be appreciated that front wall, rear wall, and side wall are relative terms used for descriptive purposes and the orientation and the nomenclature of the walls may vary depending on application. The front wall includes various ports, ports 64, 66, 68, 70, 72, 74, 76, 78, and 80 that provide interfaces for various interfaces, including inputs and outputs. In one implementation, as illustrated, the ports 64 through 80 include inputs 82 and outputs 84 and, more particularly, an RF input 86, a RJ-45 input 88, universal serial bus (USB) input/outputs 90, an Ethernet category 5 (Cat 5) coupling 92, an internal reset 94, an RS232 control 96, an audio out 98, an audio in 100, and a debug/maintenance port 102. The front wall 54 also includes various inputs 82 and outputs 84. More particularly, ports 110, 112, 114, and 116 include a 5V dc power connection 120, USB inputs/outputs 122, an RJ-45 coupling 124, and an HDMI port 126. It should be appreciated that the configuration of ports may vary with the set-top box depending on application and context. As previously alluded to, the housing 14 may include a housing-dongle combination including, with respect to the dongle 30, a unit 130 having a cable 134 with a set-top box connector 132 for selectively coupling with the set-top box 12.

Figure 4:
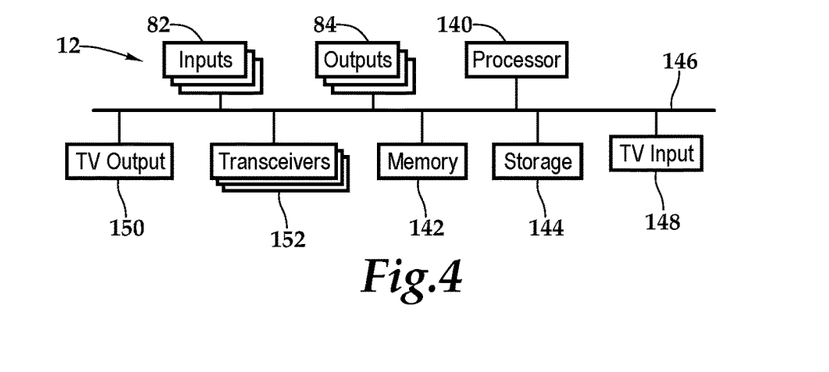
FIG. 4 is a functional block diagram depicting one embodiment of the set-top box presented in FIGS. 3A and 3B.

Within the housing 14, a processor 140, memory 142, storage 144, the inputs 82, and the outputs 84 are interconnected by a bus architecture 146 within a mounting architecture. It should be understood that the processor 140, memory 142, storage 144, the inputs 82, and the outputs 84 may be entirely contained within the housing 14 or the housing-dongle combination. The processor 140 may process instructions for execution within the computing device, including instructions stored in the memory 142 or in storage 144. The memory 142 stores information within the computing device. In one implementation, the memory 142 is a volatile memory unit or units. In another implementation, the memory 142 is a non-volatile memory unit or units. Storage 144 provides capacity that is capable of providing mass storage for the set-top box 12. Various inputs 82 and outputs 84 provide connections to and from the computing device, wherein the inputs 82 are the signals or data received by the set-top box 12, and the outputs 84 are the signals or data sent from the set-top box 12.

A content signal input 148 and a content signal output 150 are also secured in the housing 14 in order to receive content from a source in the hospitality property and forward the content, including external content such as cable and satellite and pay-per-view (PPV) programing, to the display or television located within the hotel room. A transceiver 152 is associated with the set-top box 12 and communicatively disposed with the bus 146. As shown the transceiver 152 may be internal, external, or a combination thereof to the housing. Further, the transceiver 152 may be a transmitter/receiver, receiver, or an antenna for example. Communication between various amenities in the hotel room, including the electronic door apparatus 34, and the set-top box 12 may be enabled by a variety of wireless methodologies employed by the transceiver 152, including 802.11, 3G, 4G, Edge, Wi-Fi, ZigBee, near field communications (NFC), Bluetooth low energy and Bluetooth, for example. Also, infrared (IR) may be utilized.

The memory 142 and storage 144 are accessible to the processor 140 and include processor-executable instructions that, when executed, cause the processor 140 to execute a series of operations. With respect to first processor-executable instructions, the processor-executable instructions cause the processor 140 to forward a fully tuned signal to the display. Further, the instructions may cause the processor 140 to pair with an electronic door locking apparatus 34 coupled to a door 36. The processor-executable instructions may cause the processor 140 to receive a status signal from the electronic door locking apparatus 34. In one implementation, the status signal may be relative to the open/closed status of the door 36 or locked/unlocked status of the door 36, for example. By way of further example, the status signal may relate to the "Do Not Disturb" status of the door 36 or a power state of the electronic door apparatus 34.

In one implementation, the processor-executable instructions may further include instructions that, when executed, cause the processor 140 to forward a fully tuned signal to the display 16 including a status indicator based on the received status signal. Alternatively, or in addition, the processor-executable instructions may cause the processor 140 to forward a status indicator based on the received status signal to a remote server, such as the property server 44 of FIGS. 2A and 2B.

In another implementation, second processor-executable instructions may further include instructions that, when executed, cause the processor to specify a search operation to identify a proximate wireless-enabled interactive programmable device 32. The search operation may utilize the wireless transceiver to wirelessly identify the proximate wireless-enabled interactive programmable device 32. By way of example, with respect to the search operation, the processor-executable instructions may specify a search operation to identify the proximate wireless-enabled interactive programmable device 32 by receiving advertising broadcast data from the proximate wireless-enabled interactive programmable device 32 via the wireless transceiver using, for example, a Bluetooth low energy standard, wherein the search operation utilizes the wireless transceiver to wirelessly identify the proximate wireless-enabled interactive programmable device 32. Alternatively, the processor-executable instructions, when executed, cause the processor 140 to specify a search operation to identify the proximate wireless-enabled interactive device 32 by transmitting advertising broadcast data via the wireless transceiver using, for example, a Bluetooth low energy standard, wherein the search operation utilizes the wireless transceiver to wirelessly identify the proximate wireless-enabled interactive programmable device 32.

The processor-executable instructions may further include instructions that establish a pairing between the proximate wireless-enabled interactive programmable device 32 and the set-top box 12. The processor-executable instructions may then cause the processor 140 to send formatted parallel audiovisual experience instructions to the proximate wireless-enabled interactive programmable device 32. In one implementation, the formatted parallel audiovisual experience instructions may be configured to provide a downstream parallel experience related to the content on the television.

The processor-executable instructions may still further include instructions that provide for virtual buttons on a touch screen display associated with the proximate wireless-enabled interactive programmable device 32. The virtual buttons are associated with the proximate wireless-enabled interactive programmable device 32. Instructions may then cause the processor 140 to receive and process virtual remote control functionality input instructions to control the electronic door locking apparatus 34 from the proximate wireless-enabled interactive programmable device 32 and evaluate the functionality input instructions to assign a meaning. Following the evaluation, the processor-executable instructions may generate a command signal and send the command signal to the electronic door locking apparatus 34 to effect the command. By way of example and not by way of limitation, the command signal may relate to causing the electronic door locking apparatus 34 to unlock the door or alternate the do not disturb status.

In one embodiment, third processor-executable instructions may include instructions that, when executed, cause the processor 140 to receive and server control process functionality input instructions to control the electronic door locking apparatus 34 from a remote server, evaluate the functionality input instructions to assign a meaning, generate a command signal, and send the command signal to the electronic door locking apparatus 34. The command signal may relate to re-programming the electronic door locking apparatus 34 or maintaining access beyond data, for example. In another embodiment, the processor-executable instructions may further include instructions that, when executed, cause the processor 140 to receive and process keycard data from the electronic door locking apparatus 34, evaluate the keycard data to determine access rights, generate a command signal relative to the access rights, and send the command signal to the electronic door locking apparatus 34.

In one embodiment, fourth processor-executable instructions may processor-executable instructions that cause the processor 140 to pair with the electronic door locking apparatus 34. Processor-executable instructions may also cause the processor 140 to generate a command signal relative to re-programming the electronic door locking apparatus 34 and then to send the command signal to the electronic door locking apparatus 34. The re-programming of the electronic door locking apparatus 34 may relate to issuing a new keyless entry code L or to revoking a keyless entry code L.

In one embodiment, fifth processor-executable instructions may include processor-executable instructions that cause the processor 140 to pair with the electronic door locking apparatus 34. The instructions may cause the processor 140 to receive a presence signal from the electronic door locking apparatus 34 and then send a command signal via the signal output to the display 16 to turn the display 16 ON. The processor 140 may be further caused to send a second command signal via the signal output to the display to initiate a gateway on the display 16. Then, the processor 140 may receive a guest check-out signal from an interaction with the set-top box 12. The processor 140 then receives a guest G leave signal from the electronic door locking apparatus 34 that indicates the guest G has left the room and the guest G leave signal is forwarded to a remote server, such as the property server 44 or the system server 46.

Figure 5:
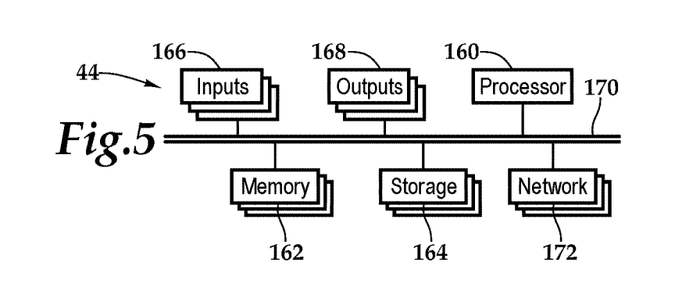
FIG. 5 is a functional block diagram depicting one embodiment of a property server presented in FIGS. 1, 2A, and 2B.

Referring now to FIG. 5, one embodiment of the property server 44 as a computing device includes a processor 160, memory 162, storage 164, inputs 166, and outputs 168 interconnected with various buses 170 in a common or distributed, for example, mounting architecture. A network interface 172 is also connected to the various buses 170 to provide a controller, including required computer hardware components, that connect the property server 44 to one or more computer networks. In other implementations, in the computing device, multiple processors and/or multiple buses may be used, as appropriate, along with multiple memories and types of memory. Further still, in other implementations, multiple computing devices may be provided and operations distributed therebetween. The processor 160 may process instructions for execution within the property server 44, including instructions stored in the memory 162 or in storage 164. The memory 162 stores information within the computing device. In one implementation, the memory 162 is a volatile memory unit or units. In another implementation, the memory 162 is a non-volatile memory unit or units. Storage 164 includes capacity that is capable of providing mass storage for the property server 44. Various inputs 166 and outputs 168 provide connections to and from the server 40, wherein the inputs 166 are the signals or data received by the property server 44, and the outputs 168 are the signals or data sent from the property server 44.

The memory 162 is accessible to the processor 160 and includes processor-executable instructions that, when executed, cause the processor 160 to execute a series of operations. The processor-executable instructions cause the processor 160 to update periodically or on-demand, depending on the operational configuration, a database or update portion thereof, with current access keycard data relative to the electronic door locking apparatuses to one or more of the set-top boxes directly or through a property headend.

The processor-executable instructions may also generate a command signal and send the command signal to the electronic door locking apparatus 34 via the set-top box 12. By way of example and not by way of limitation, the command signal may relate to causing the electronic door locking apparatus 34 to unlock the door or alternate the do not disturb status. Further, in one embodiment, the command signal may be multiple signals that relate to reprogramming one or more of the electronic door locking apparatuses via the set-top boxes, for example. Such instructions may relate to issuing a new keyless entry code L or revoking a keyless entry code L. Additionally, similar to the display 16, the property server 44 may receive various status signals and have processor-executable instructions relative thereto.

Figures 6, 7:
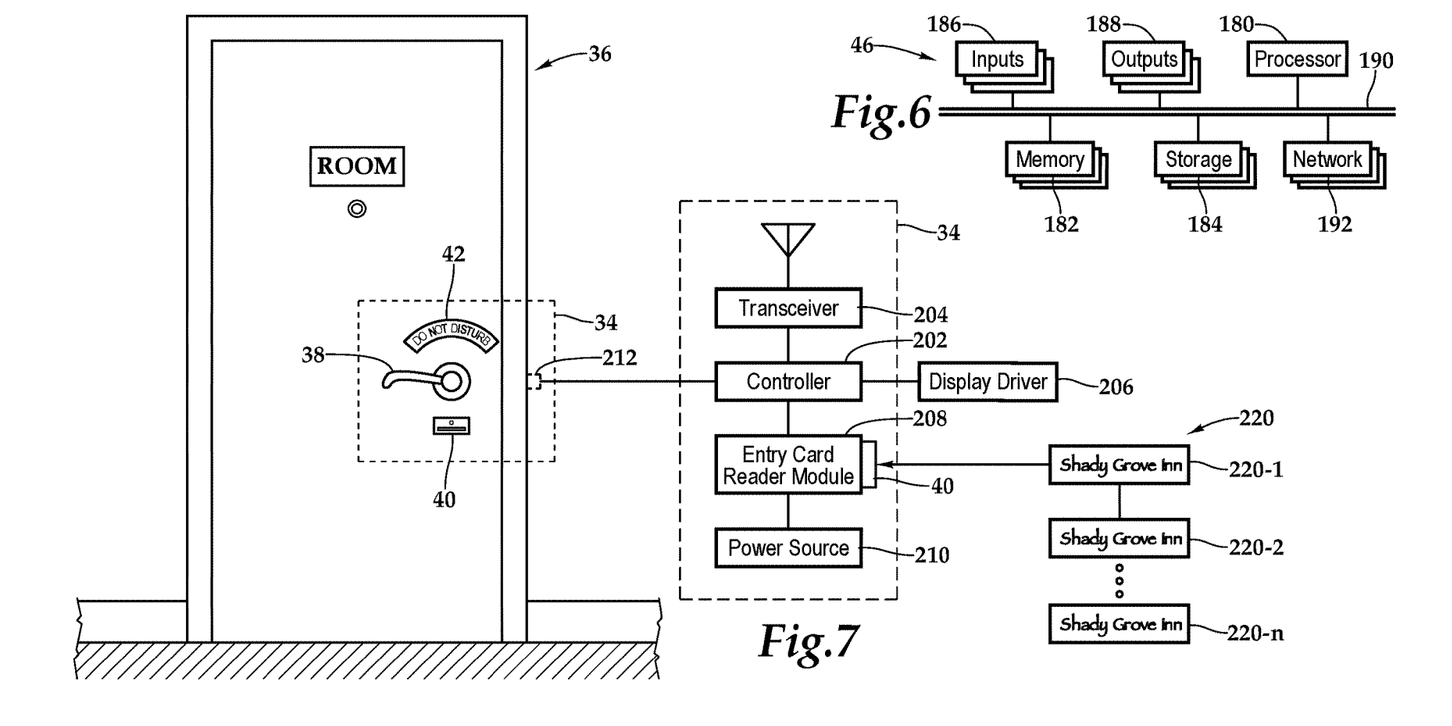
FIG. 6 is a functional block diagram depicting one embodiment of a system server presented in FIGS. 1, 2A, and 2B.
FIG. 7 is a schematic block diagram of one embodiment of a door and an electronic door locking apparatus depicted in FIG. 1.

Referring now to FIG. 6, one embodiment of the system server 46 as a computing device includes a processor 180, memory 182, storage 184, inputs 186, and outputs 188 interconnected with various buses 190 in a common or distributed, for example, mounting architecture. A network interface 192 is also connected to the various buses 190 to provide a controller, including required computer hardware components, that connect the system server 46 to one or more computer networks. In other implementations, in the computing device, multiple processors and/or multiple buses may be used, as appropriate, along with multiple memories and types of memory. Further still, in other implementations, multiple computing devices may be provided and operations distributed therebetween. The processor 180 may process instructions for execution within the system server 46, including instructions stored in the memory 182 or in storage 184. The memory 182 stores information within the computing device. In one implementation, the memory 182 is a volatile memory unit or units. In another implementation, the memory 182 is a non-volatile memory unit or units. Storage 184 includes capacity that is capable of providing mass storage for the system server 46. Various inputs 186 and outputs 188 provide connections to and from the system server 46, wherein the inputs 186 are the signals or data received by the system server 46, and the outputs 188 are the signals or data sent from the system server 46. The memory 182 is accessible to the processor 180 and includes processor-executable instructions that, when executed, cause the processor 180 to execute a series of operations. In some embodiments, the processor-executable instructions cause the processor 180 to execute a hotel reservation system. In still other embodiments, the processor-executable instructions cause the processor 180 to execute a management system.

Thus, the systems and methods disclosed herein enable set-top boxes to have enhanced behavior controls that control electronic door locking apparatuses. Further, the systems and methods disclosed herein may enable users to use existing electronic devices as a temporary remote control device or keyless entry device to control an electronic door locking apparatus via a set-top box. Additionally, the status of the electronic door locking apparatuses may be discerned and as needed the programming of the electronic door locking apparatus may be modified as needed. Therefore, the systems and methods presented herein avoid the need for additional or expensive high functionality remote controls.

Referring now to FIG. 7, one embodiment of the door locking apparatus 34 is depicted. As shown, the door locking apparatus 34 may be mounted adjacent the door 36 or on the door 36 or in another suitable location. The door locking apparatus 34 may be an integral unit that is easily mounted at each door site and may include serval components. The components of the door locking apparatus 34 may include a controller 202 coupled to a transceiver 204 and a display driver 206, which is coupled to the indicator 42. Additionally, the electronic reader 40 is supported by an entry card reader module 208. A power source 210 supplies power to the door locking apparatus 34 and may include battery power or a wired electrical interface connection, for example, to a 120V source. A door lock actuator 212 is coupled to the controller 202 and locks/unlocks the door 36.

The electronic reader 40 and the entry card reader module 208 perform the task of reading the entry card as a door key and delivering the card identity information to the controller 202. It should be appreciated that the electronic reader 40 and the entry card reader module 208 may be equipped to work with either magnetic strip cards, radio-frequency identification (RFID) cards, or wireless interactive programmable devices, for example. Further, the entry cards 220, including entry cards 220-1, 220-2, . . . 220-*n*, and the electronic door locking apparatus 34 may utilize key identification locking wherein the system is programmed to accept multiple identifications, for example a master identification for staff and various guest identifications. Other key identification locking schemes that may be utilized include sequence identification where a newer sequence identification will inform the electronic door locking apparatus 34 to stop accepting an older sequence identification, expiration date based key identification locking, or check-in date-based key identification locking, for example.

The controller 202 is electronically connected to receive information from the entry card reader module 208 and compare information with current access keycard data relative to the electronic door locking apparatus 34 stored at the controller 202 or the set-top box 12 via the use of the transceiver 204. The electronic door locking apparatus generates a lock actuation signal, which is sent to door lock actuator 212, when it determines that an entry card, such as entry card 220-1 being read at the electronic reader 40 matches an approved card. The controller 202 may include an associated memory for storing information received from the set-top box 12, allowing all such stored information to be continually available. While it is necessary to have a local controller 202 which has memory and processing capability as described herein, it should be appreciated that a portion or all of the processing tasks of the controller 202 may be performed by the set-top box 12 or the set-top box 12 in combination with the property server 44.

In operation, the controller 202 may pair with a smart device, such as the proximate wireless-enabled interactive programmable device 32 having keyless entry code L associated therewith, to enable the locking or unlocking of the door 36. Additionally, the controller 202 may send status signals to the set-top box 12 via the aforementioned pairing relative to the power status, such as low battery or power source good or power source needs maintenance, or the status of the door such as being open/closed or locked/unlocked. The status signals may also indicate which entry cards 220 or keyless entry card devices, such as smart devices, are utilized and attempted to be utilized to gain entry to the door 36. The status signal may also relate to the status of the "Do Not Disturb" indication, which may be electronically shown on the display 16. In addition to sending status signals, the electronic door locking apparatus 34 may receive commands from the set-top box 12 or the property server 44 via the set-top box 12 or a guest G via the set-top box 12, for example. Such commands may relate to unlocking the door, changing the "Do Not Disturb" status, or reprogramming the keycard data relative to an access keycard database.

Figure 8:
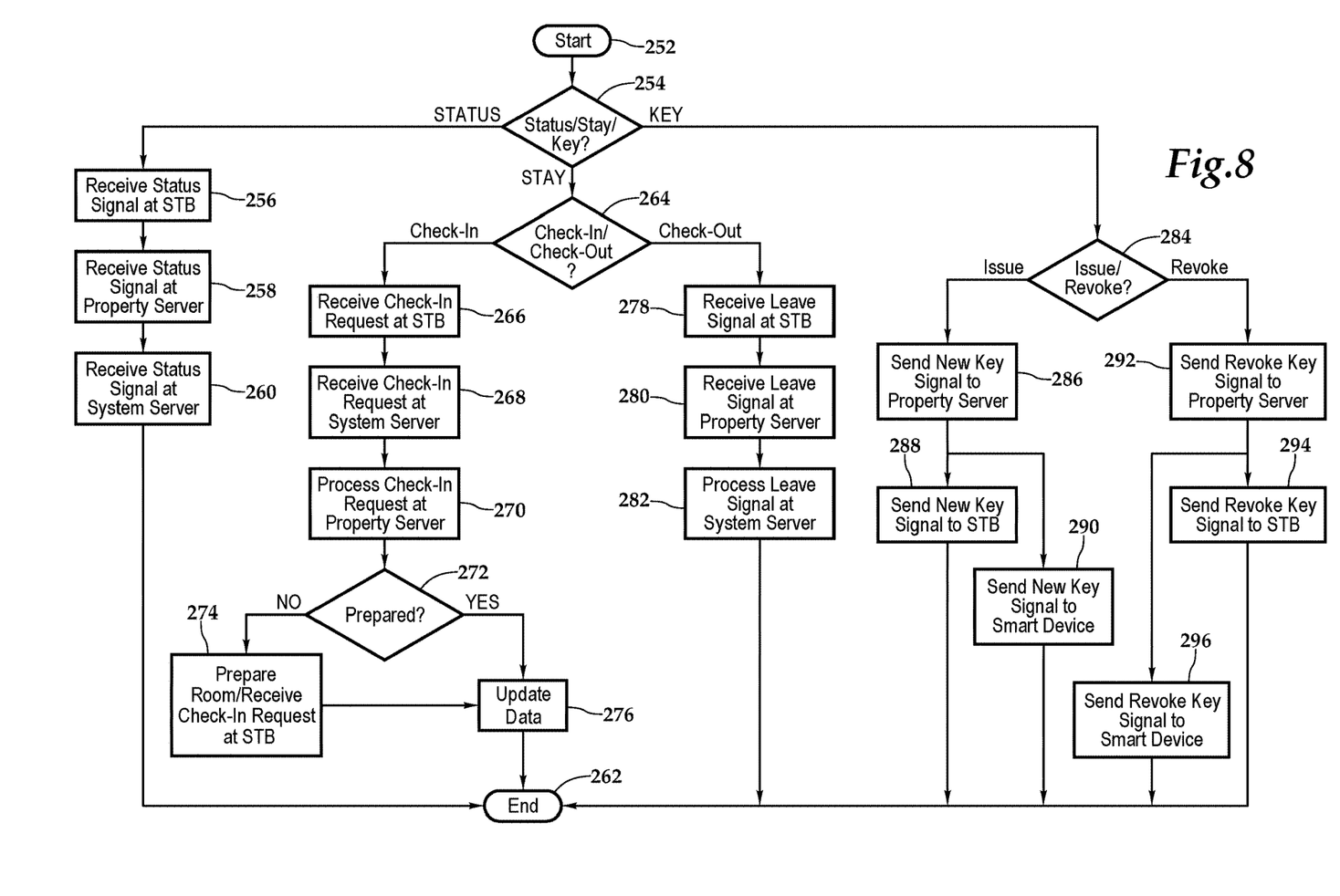
FIG. 8 is a flow chart depicting one embodiment of a method for providing a set-top box having enhanced behavioral controls according to the teachings presented herein.

FIG. 8 depicts one embodiment of a method for providing enhanced content, according to the teachings presented herein. The methodology starts at block 252 where a pairing may be established between the set-top box and electronic locking apparatus, which is room-collocated with the set-top box. At decision block 254, the methodology may provide status information, interaction regarding the stay, or key services. With respect to status information, the methodology advances to block 256 where the set-top box receives a status signal from the electronic door locking apparatus. The status signal may relate to the open/closed status of the door, locked/unlocked status of the door, a "Do Not Disturb" status of the door, a power state of the electronic door locking apparatus, or the successful/unsuccessful use of a keycard at the electronic door locking apparatus, for example. At block 258, the status signal is forwarded to the property server, where it is received. Subsequently, the status signal is forwarded to the system server, where it is received at block 260. The methodology may then advance to block 262, where the methodology ends.

Returning to decision block 254, with respect to interaction regarding the stay, the methodology advances to decision block 264, where the method may address check-in or check-out actions by a guest. At block 266, the guest checks in either at a front desk or using an application on the proximate wireless-enabled interactive programmable device that the guest is carrying. At block 268, the request to check-in is provided to the system server, which in some embodiments handles reservations. At block 270, the check-in request is received by the property server. At decision block 272, if the room is not yet prepared for the guest, then the methodology advances to block 274 where the room is prepared for guest service or appropriately selected and the check-in request is received at the set-top box in the room. The methodology then advances to block 276 where applicable data across the system server, property server, and set-top box is updated. The methodology then ends at block 262. Returning to block 272, if the room is already prepared and the set-top box notified of the guest's arrival then the methodology advances to block 276, where, as previously discussed, applicable data across the system server, property server, and set-top box is updated prior to the methodology concluding at block 262.

Returning to decision block 264, with respect to checking out, the methodology advances to block 278, where, in one embodiment, a leave signal is received at the set-top box. More specifically, the set-top box may be paired with the proximate wireless-enabled interactive programmable device and the set-top box may receive and process in-room remote control functionality input instructions from the proximate wireless-enabled interactive programmable device. One such instruction may be to check out. Alternatively, an in-room remote control may be utilized with the display and set-top box for the guest to check out. Following the guest checking out, the electronic door apparatus may forward a leave signal when the door is opened and closed to the set-top box. The leave signal is then forwarded to the property server at block 280 and the system server at block 282. The property server and the system server then take appropriate steps to close the account and prepare the room for the next guest prior to the methodology ending at block 262.

Returning to decision block 254, with respect to key services, the methodology advances to decision block 284 where the set-top box and servers (e.g., property server and system server) may perform, in one implementation, control and validation operations to issue and/or revoke a key and reprogram the electronic door locking apparatus. With respect to issuing a new keyless entry code, at block 286, a new key signal is provided to the property server. The new key signal may originate from a guest request, a check-out, or a management request, for example. At block 288, the new key signal is forwarded from the property server to the set-top box, which provides the new key signal to the electronic door locking apparatus to complete the issuance of a new keyless entry code. In parallel, at block 290, the new key signal is forwarded from the property server to the appropriate smart devices. In this manner, the desired electronic door locking apparatus and the appropriate smart devices which may interact with the electronic door locking apparatus are provided the new programming. The methodology ends at block 262.

On the other hand, with respect to revoking a keyless entry code, at block 292, a revoke key signal is provided to the property server. The revoke key signal may originate from a guest request, a check-out, or a management request, for example. At block 294, the revoke key signal is forwarded from the property server to the set-top box, which provides the revoke key signal to the electronic door locking apparatus to complete the revocation of the keyless entry code. In parallel, at block 296, the revoke key signal is forwarded from the property server to the appropriate smart devices. In this manner, the desired electronic door locking apparatus and the appropriate smart devices which may interact with the electronic door locking apparatus are provided the new programming. The methodology ends at block 262. With respect to issuing and revoking new keys to change the electronic programming at the electronic door locking apparatus, it should be appreciated each electronic door locking apparatus may include multiple keyless entry codes and the teachings presented herein with respect to issuing a revoking keyless entry codes may change one or more the keyless entry codes.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for providing interaction with an electronic door locking apparatus, the system comprising:
    a programming interface being configured to communicate with a set-top box having a processor, non-transitory memory, storage, a signal input, a signal output, and a wireless transceiver interconnected in a busing architecture, the signal input configured to receive a source signal from an external source, the signal output configured to forward a fully tuned signal to a display, the wireless transceiver configured to communicate with an electronic door locking apparatus coupled to a door, the electronic door locking apparatus being room-collocated with the set-top box; and
    the non-transitory memory accessible to the processor, the memory including processor-executable instructions that, when executed by the processor, cause the system to:
    pair with the electronic door locking apparatus,
    receive a presence signal from the electronic door locking apparatus, and
    send a command signal via the signal output to the display to turn the display ON.

2. The system as recited in claim 1, wherein the processor-executable instructions further comprise processor-executable instructions that, when executed by the processor, cause the system to:
    receive and process server control functionality input instructions from a remote server, and
    evaluate the server control functionality input instructions to assign a meaning.

3. The system as recited in claim 1, wherein the processor-executable instructions further comprise processor-executable instructions that, when executed by the processor, cause the system to:
    send a second command signal via the signal output to the display to initiate a gateway on the display.

4. The system as recited in claim 1, wherein the processor-executable instructions further comprise processor-executable instructions that, when executed by the processor, cause the system to:

receive a guest check-out signal,
receive a guest leave signal from the electronic door locking apparatus, and
forward the guest leave signal to a remote server.

5. The system as recited in claim 1, wherein the processor-executable instructions further comprise processor-executable instructions that, when executed by the processor, cause the system to:
receive a status signal from the electronic door locking apparatus.

6. The system as recited in claim 5, wherein the status signal is relative to the open/closed status of the door.

7. The system as recited in claim 5, wherein the status signal is relative to the locked/unlocked status of the door.

8. The system as recited in claim 5, wherein the status signal is relative to a do not disturb status of the door.

9. The system as recited in claim 5, wherein the status signal is relative to a power state of the electronic door locking apparatus.

10. The system as recited in claim 5, wherein the processor-executable instructions further comprise processor-executable: instructions that, when executed by the processor, cause the system to:
forward a status indicator based on the received status signal to a remote server.

11. The system as recited in claim 1, wherein the processor-executable instructions further comprise processor-executable instructions that, when executed by the processor, cause the system to:
send a command signal to the electronic door locking apparatus, the command signal causing the electronic door locking apparatus to unlock the door.

12. The system as recited in claim 1, wherein the processor-executable instructions further comprise processor-executable instructions that, when executed by the processor, cause the system to:
receive and process keycard data from the electronic door locking apparatus,
evaluate the keycard data to determine access rights,
generate a command signal relative to the access rights, and
send the command signal to the electronic door locking apparatus.

13. A system for providing interaction with an electronic door locking apparatus, the system comprising:
a programming interface being configured to communicate with a set-top box having a processor, non-transitory memory, storage, a signal input, a signal output, and a wireless transceiver interconnected in a busing architecture, the signal input configured to receive a source signal from an external source, the signal output configured to forward a fully tuned signal to a display, the wireless transceiver configured to communicate with an electronic door locking apparatus coupled to a door, the electronic door locking apparatus being room-collocated with the set-top box; and
the non-transitory memory accessible to the processor, the including processor-executable instructions that, when memory executed by the processor, cause the system to:
pair with the electronic door locking apparatus,
receive a presence signal from the electronic door locking apparatus, and
send a command signal via the signal output to initiate a gateway on the display.

14. A system for providing interaction with an electronic door locking apparatus, the system comprising:
a programming interface being configured to communicate with a set-top box having a processor, non-transitory memory, storage, a signal input, a signal output, and a wireless transceiver interconnected in a busing architecture, the signal input configured to receive a source signal from an external source, the signal output configured to forward a fully tuned signal to a display, the wireless transceiver configured to communicate with an electronic door locking apparatus coupled to a door, the electronic door locking apparatus being room-collocated with the set-top box; and
the non-transitory memory accessible to the processor, the memory including processor-executable instructions that, when executed by the processor, cause the system to:
pair with the electronic door locking apparatus,
receive a guest check-out signal,
receive a guest leave signal from the electronic door locking apparatus, and
reprogram the electronic door locking apparatus to revoke a keyless entry code.

15. The system as recited in claim 14, wherein the processor-executable instructions further comprise processor-executable instructions that, when executed by the processor, cause the system to:
receive a command signal from a remote server, the command signal including a reprogramming signal to revoke the keyless entry code at the electronic door locking apparatus.

16. The system as recited in claim 14, wherein the processor-executable instructions further comprise processor-executable instructions that, when executed by the processor, cause the system to:
receive and process server control functionality input instructions from a remote server, and
evaluate the server control functionality input instructions to assign a meaning.

17. The system as recited in claim 14, wherein the processor-executable instructions further comprise processor-executable instructions that, when executed by the processor, cause the system to:
send a command signal to the electronic door locking apparatus, the command signal causing the electronic door locking apparatus to unlock the door.

18. The system as recited in claim 14, wherein the processor-executable instructions further comprise processor-executable instructions that, when executed by the processor, cause the system to:
receive and process keycard data from the electronic door locking apparatus,
evaluate the keycard data to determine access rights,
generate a command signal relative to the access rights, and
send the command signal to the electronic door locking apparatus.

* * * * *